United States Patent
Cain

(10) Patent No.: US 12,028,559 B2
(45) Date of Patent: Jul. 2, 2024

(54) SYSTEM AND METHOD FOR OPTIMIZING THE DISTRIBUTION OF AVAILABLE MEDIA PRODUCTION RESOURCES

(71) Applicant: Grass Valley Limited, Newbury (GB)

(72) Inventor: James Westland Cain, Berkshire (GB)

(73) Assignee: GRASS VALLEY LIMITED, Newbury (GB)

( * ) Notice: Subject to any disclaimer, the term of this patent is extended or adjusted under 35 U.S.C. 154(b) by 209 days.

(21) Appl. No.: 17/807,032

(22) Filed: Jun. 15, 2022

(65) Prior Publication Data
US 2022/0408126 A1 Dec. 22, 2022

Related U.S. Application Data

(60) Provisional application No. 63/212,259, filed on Jun. 18, 2021.

(51) Int. Cl.
  *H04N 21/231* (2011.01)
  *H04N 21/239* (2011.01)

(52) U.S. Cl.
  CPC ... *H04N 21/23109* (2013.01); *H04N 21/2393* (2013.01)

(58) Field of Classification Search
  CPC .................. H04N 21/23109; H04N 21/2393
  USPC ........................................................ 725/115
  See application file for complete search history.

(56) References Cited

U.S. PATENT DOCUMENTS

| 10,348,794 | B2 | 7/2019 | Hundemer | |
| 11,785,232 | B2 * | 10/2023 | Dunham | H04N 21/2343 375/240.27 |
| 11,860,924 | B2 * | 1/2024 | Cain | G06F 16/164 |
| 2004/0240541 | A1 | 12/2004 | Chadwick et al. | |
| 2008/0262996 | A1 | 10/2008 | Yogeshwar et al. | |

FOREIGN PATENT DOCUMENTS

EP   3293647 A1 *  3/2018   ........... G06F 16/164

OTHER PUBLICATIONS

International Search Report and Written Opinion in PCT/EP2022/066622, mailed Nov, 3, 2022, 10 pages.
Serre, E., "File-Based Live Production: avec K2 Summit, K2 Dyno Replay System et K2 Dyno Production Assistant", Application Note, May 2011, 14 pages.

* cited by examiner

*Primary Examiner* — Nathan J Flynn
*Assistant Examiner* — Caroline Somera
(74) *Attorney, Agent, or Firm* — ARENTFOX SCHIFF LLP

(57) ABSTRACT

A system is provided for optimizing the distribution of media production resources. The system includes a grain store having a persistent file system that stores essence grains upon receipt into individual files according to a folder layout. The system also includes a grain store manager that dynamically names the individual files upon receipt of the essence grains to configure the folder layout to form a natural index that maps bytes of the essence grains to a numerical index of the essence grains, respectively, generates a descriptor for flows of files in the folder layout, generates a unique identity for a plurality of sources in the grain store, and receives a media access request from a client device application based on a media production workflow. The grain store then dynamically accesses the essence grains by identifying the unique identity of the respective group of flows and the descriptor for the format.

22 Claims, 7 Drawing Sheets

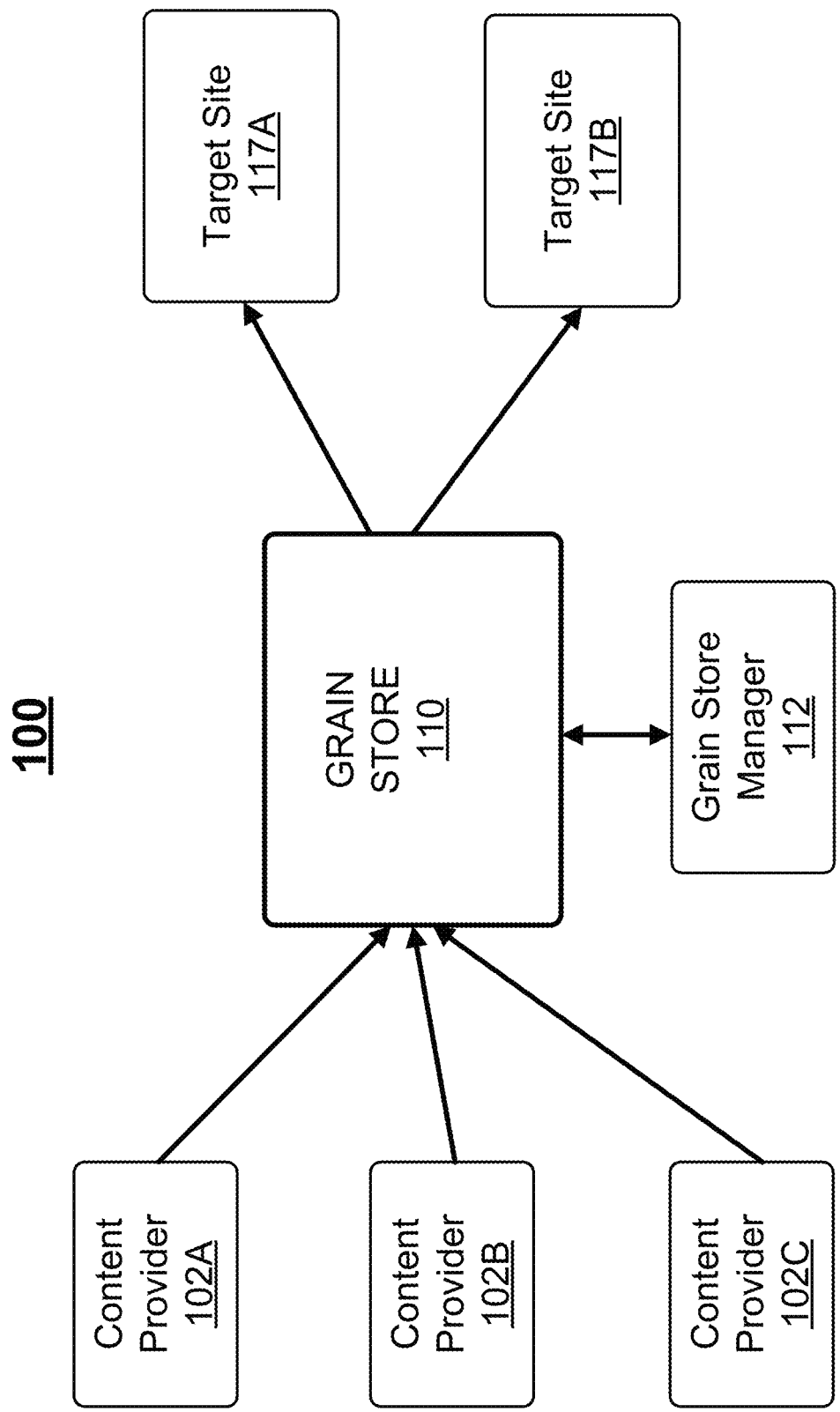

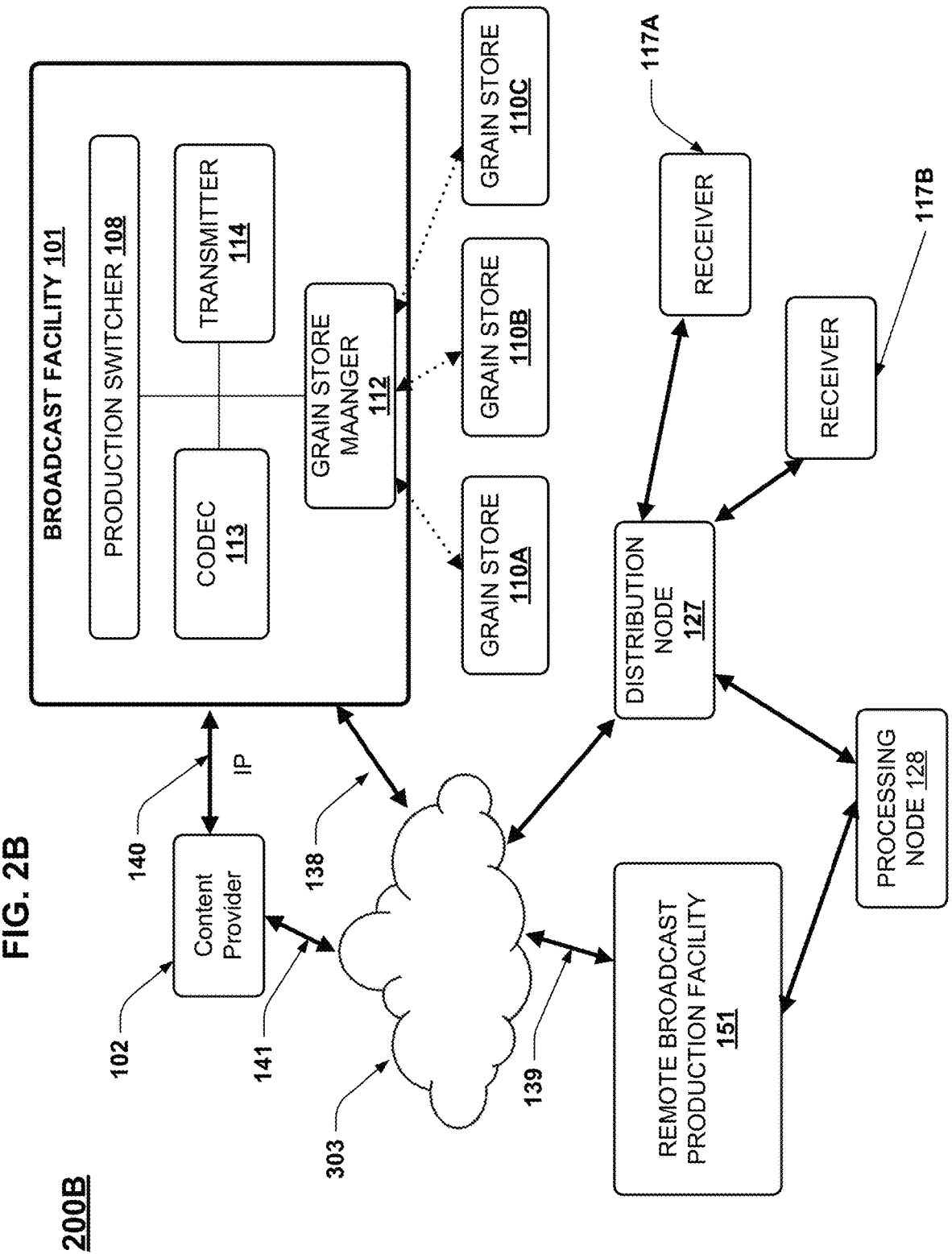

SYSTEM AND METHOD FOR OPTIMIZING THE DISTRIBUTION OF AVAILABLE MEDIA PRODUCTION RESOURCES

CROSS REFERENCE TO RELATED APPLICATIONS

The present application claims priority to U.S. Patent Provisional Application No. 63/212,259, filed Jun. 18, 2021, the entire contents of which are hereby incorporated by reference.

TECHNICAL FIELD

The present disclosure generally relates to media content distribution, and, more particularly, to a system and method for optimizing the distribution of available media production resources.

BACKGROUND

Live television broadcasting typically involves capturing media content from a live scene (e.g., a sports venue, news broadcast, etc.), transmitting the captured content to a remote production facility where the video and audio signals are managed by production switchers, and then encoding the signals for transport to a distribution network, such as a television broadcasting network. However, with the ever increasing amount of media content that is being generated and stored for later recall, entities and individuals are constantly searching for techniques to minimize resource consumption and reduce costs for such media storage while also maximizing the availability of such content, for example, in the context of a media production.

Currently, content consumers typically archive one or multiple versions of media essence in a specific location and for recall at a subsequent point in time. By doing so, the amount of media essence stored at a given location can quickly become very costly and in some instances unmanageable. Accordingly, a system and method is needed to more efficiently manage the storage and distribution of media content.

SUMMARY OF THE INVENTION

According to an exemplary aspect, a system is provided for optimizing the distribution of media production resources. In this aspect, the system includes a receiver configured to receive a plurality of essence grains of at least one media file (e.g., from one or more production cameras); a grain store comprising a persistent file system configured to store each of the received plurality of essence grains upon receipt into individual files according to a folder layout; and a grain store manager to manage the storage and distribution of the media content.

Moreover, according to the exemplary aspect, the grain store manager is configured to dynamically name the individual files upon receipt of the plurality of essence grains, such that the folder layout form a natural index mapping bytes of the essence grains to a numerical index of the essence grains, respectively, generate a descriptor for each flow of files in the folder layout to identify a format of the respective flow, with each flow including a plurality of essence grains being the same format, generate a unique identity for a plurality of sources in the grain store that each include a group of flows offering the same essence at different formats, and receive a media access request from a client device application based on a media production workflow that specifies functional requirements and timing requirements of the available media production resources for the media production workflow.

The grain store manager is further configured to dynamically access a portion of the plurality of essence grains in the individual files by identifying the unique identity of the respective groups of flows and the descriptor for the respective format of the flow that satisfies the functional requirements, accessing a portion of the individual files having the identified unique identity and descriptor and according to the folder layout based on the timing requirements specified in the received media access request, and returning the accessed portion of the individual files to the client device application to satisfy the media production workflow.

Thus, according to an exemplary embodiment, the name of the individual files and the folder layout are independent of a file stream definition and a file storage type of the received at least one media file. Moreover, the essence grains each comprise at least one of video frames, groups of pictures of video, audio samples and ancillary data of media content.

In another exemplary aspect, the system further includes a virtual file system (VFS) built on top of the grain stores and configured to receive the media access request from the client device and coordinate with the grain store manager to process the media access request and deliver the accessed portion of the individual files to the client device.

In another exemplary aspect, the grain store manager is further configured to dynamically name the individual files to configure the folder layout to provide a uniform representation of the grain store according to the numerical index of the essence grains, respectively.

In another exemplary aspect, the grain store manager is further configured to form the group of flows offering the same essence at different formats that include a plurality of resolution qualities of the same essence.

In another exemplary aspect, the grain store manager is further configured to return the accessed portion of the individual files to the client device application by balancing a requested resolution quality and a time urgency to satisfy the media production workflow.

In another exemplary aspect, the grain store is geographically distributed across a plurality of separate grain store locations.

According to an exemplary embodiment, a system is provided for optimizing the distribution of media production resources. In this aspect, the system includes a grain store comprising a persistent file system that is geographically distributed across a plurality of physical locations and that is configured to store each of a plurality of essence grains upon receipt by the grain store into a plurality of individual files according to a folder layout; and a grain store manager configured to dynamically name the individual files upon receipt of the plurality of essence grains, such that the folder layout forms a natural index mapping bytes of the essence grains to a numerical index of the essence grains, respectively, generate a descriptor for each of a plurality of flows of files in the folder layout to identify a format of each respective flow, with each of the plurality of flows including a plurality of essence grains being the same format, generate a unique identity for a plurality of sources in the grain store that each include a group of flows offering the same essence at different formats, and receive a media access request from a client device application based on a media production workflow that specifies functional requirements and timing requirements of the available media production resources for the media production workflow. The grain store manager is further configured to dynamically access a portion of the plurality of essence grains in the individual files by identifying the unique identity of the respective group of flows and the descriptor for the respective format of the flow in the group that satisfies the functional requirements, accessing a portion of the individual files having the identified unique identity and descriptor and according to the folder layout based on the timing requirements specified in the received media access request, and returning the accessed portion of the individual files to the client device application to satisfy the media production workflow.

According to an exemplary embodiment, a system is provided for optimizing the distribution of media production resources. In this aspect, the system includes a grain store comprising a persistent file system configured to store each of a plurality of essence grains upon receipt into a plurality of individual files according to a folder layout; and a grain store manager configured to dynamically name the individual files upon receipt of the plurality of essence grains to configure the folder layout to form a natural index that maps bytes of the essence grains to a numerical index of the essence grains, respectively, generate a descriptor for each of a plurality of flows of files in the folder layout to identify a format of each respective flow, generate a unique identity for a plurality of sources in the grain store that each include a group of flows offering the same essence at different formats, receive a media access request from a client device application based on a media production workflow that specifies requirements of the available media production resources for the media production workflow, dynamically access a portion of the plurality of essence grains in the individual files by identifying the unique identity of the respective group of flows and the descriptor for the respective format of the flow in the group that satisfies the requirements, and return the accessed portion of the individual files to the client device application to satisfy the media production workflow.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIG. 1 illustrates a high-level block diagram of a system for optimizing the distribution of available media production resources.

FIGS. 2A-2B illustrates a block diagram of a system 200A for optimizing the distribution of available media production resources according to an exemplary embodiment.

DETAILED DESCRIPTION

Figure 2A:
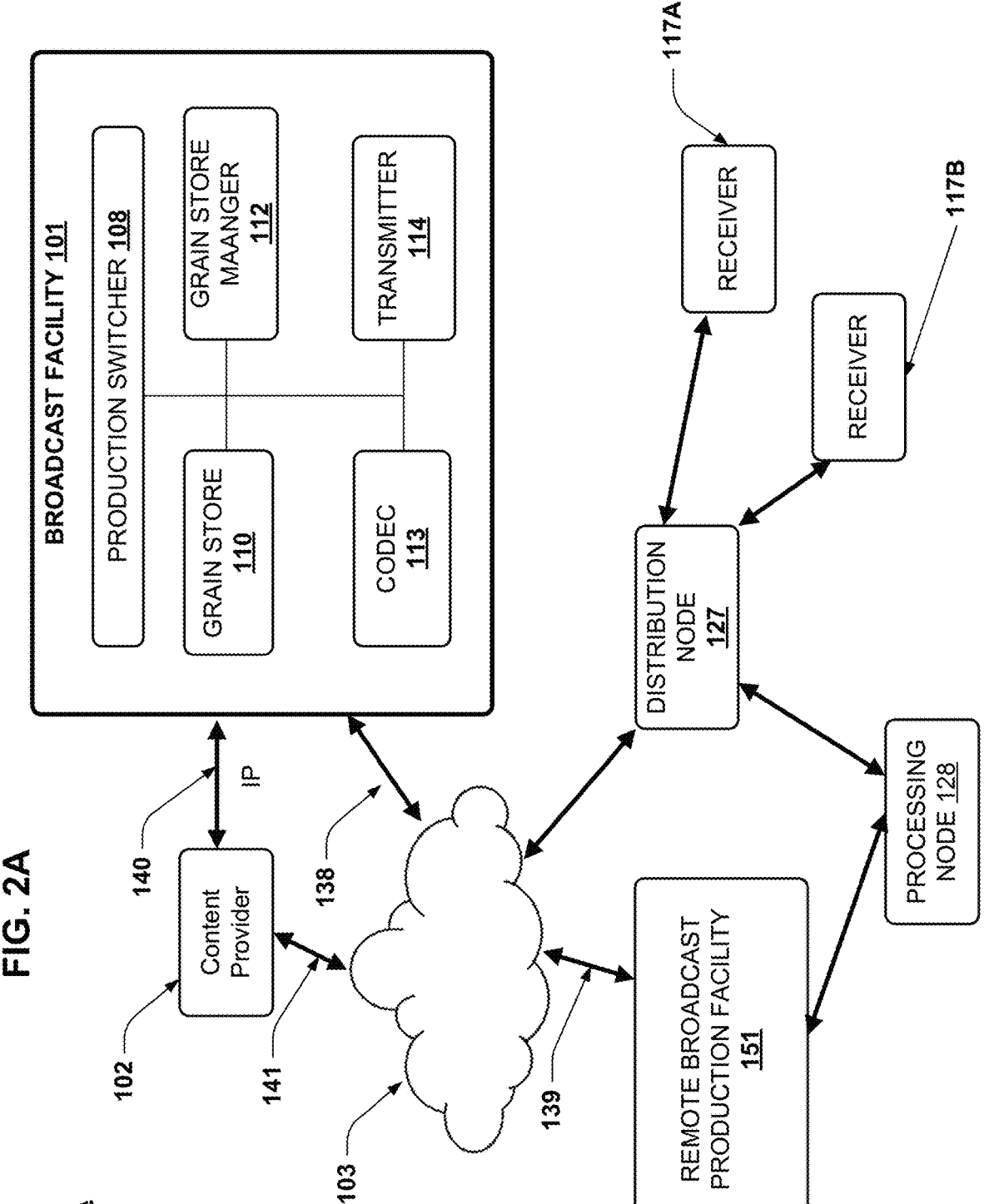

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, the system and method disclosed herein is constructed for managing and distributing essence through a network for media production and/or editing, for example. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

According to an exemplary aspect and for purposes of this disclosure, essence can generally be considered to be media content or media assets, such as any type of media file, such as media, video, audio, captions or the like, that can be consumed by a content consuming device. More specifically, the system disclosed herein utilizes one or more "grains stores" for optimizing the distribution of available media production resources. In general, payloads of essence (i.e., media content) are considered to be "grains" that are made available by one or more flows for a source of media content.

According to an exemplary aspect, grains each comprise at least one of a video frame, a group of pictures of video, audio samples and ancillary data of media content. Moreover, grains have a known identity and set format. A source has a plurality of flows that each contains a plurality of grains, and with each flow being grains of a different formats. A flow is essentially a mapping between time and grains and a contiguous group of one or more grains is called a range. The set of grains made available by a given flow can be one or more ranges. The units of a range are measured in time, and, therefore, a range can be defined by a duration with a start time and an end time. By inference, a grain also has a range even so for a single grain or payload of media essence.

FIG. 1 illustrates a high-level block diagram of a system for optimizing the distribution of available media production resources. As shown, the system 100 includes a plurality of content providers 102A, 102B and 102C and a plurality of target sites 117A and 117B with the grain store 110 communicatively coupled therebetween. In an exemplary aspect, each of the content providers 102A-102C and target sites 117A and 117B can be cloud hosted platforms or on premises (e.g., hardware video servers) according to exemplary aspects.

Moreover, a controller 112 (which can be considered a grain store manager 112) is configured to manage the distribution of the media content to and from the grain store 110 to the target sites 117A and 117B, which can be computing or client devices, for example. As will be discussed in greater detail below, the grain store manager 112 can be implemented as a computing device or module that is configured to dynamically and optimally manage the distribution of content from the grain store 110 to one or more target sites 117A and/or 117B. Moreover, it is generally noted that the grain store 110 and/or grain store manager 112 can be located in the cloud (e.g., a Cloud hosted platform) or on premises as best suited based on the implementation of the system 100. Although the grain store 110 is shown as a single component in FIG. 1, the grain store 110 can be comprised of a plurality of grain stores that are geographically (e.g., globally) distributed from one another, for example, across the country or even globally. As will be described in greater detail below, the gran store manager 112 is configured to control storage of the grains across this distributed environment and also generate a folder layout for the particular essence to facilitate optimized distribution of a requested portion of the essence from the respective geographically distributed grain store locations. Effectively, the grain store 110 is configured to store the media (i.e., the essence) in persistent way, e.g., on disk, such that it has the properties of both a stream and a file at the same time.

According to an exemplary aspect, the folder layout can be considered a registry of the grains of essence and is globally distributed to web servers, for example, to facilitate media access request of a subset of gains by a plurality of client devices, which can be submitted concurrently in one aspect. Thus, the grain store 110 makes available a coordinated set of assets that are independent of form and location, and which can be accessed or deployed for any given workflow in any given time requirement of the workflow. The registry (i.e., the folder layout) provides a uniform representation of the grain store system to facilitate such access. Importantly, the media (i.e., the essence grains) can be accessed independent of a file stream definition and a file storage type. Instead, the workflow and, in particular, the media access request, can simply request the media content based on a defined subset of grains and at a particular quality. The distributed system can then provide an optimal and dynamic distribution of these grains for executed the workflow.

In any event, according to the exemplary aspect the content providers 102A-102C are essence sources (e.g., video servers, production cameras or the like) that generate and/or store media content, i.e., portions of media essence. It should be appreciated that while three content providers 102A-102C are shown in system 100, more or less than three content providers can be provided in the exemplary system 100.

Moreover, the grain store 110 is configured to store and manage the media content for distribution to be used in a video production workflow in an exemplary aspect. The grain store 110 can be a persistent (e.g., RAM) or disk-based file and folder layout that is constructed to store one or more essence grains in individual files with the individual files being part of a distributed system. As will be described in detail below, the files can be named (e.g., by grain store manager 112), such that the folder contents form a natural index, which can also allow a simple mapping between time and bytes. Moreover, the grain store manager 112 can be configured to assign a descriptor to each flow of grains folder, where the descriptor is constructed as a technical description of the format that particular flow adheres to. Effectively, the grain store manager 112 can build a registry of the distributed media essence.

As described above, a group of flows is constructed to offer the same material (i.e., the same media essence) at different qualities (e.g., high definition vs. standard definition) and/or formats. That is, a source of media essence has an identity, such that two sources with the same identity carry equivalent essence. In other words, a combined group of flows is considered a source, with each source having a unique identity. In this regard, it is noted that two identical sources do not necessarily offer the same exact flows (i.e., identical format), since the form and/or format (the terms are used synonymously) of the essence in each flow that is presented can vary depending on available facilities. Furthermore, a set of flows in a source site do not have to carry the same ranges. It should also be appreciated that accessing different instances of two identical sources may not be equal in terms of cost (e.g., consumption of resources and/or economic costs). For example, if one source is in an online archive (e.g., Amazon S3®), reading grains from this instance of a source carries a financial overhead that may not be requires if the same source essence is stored on premises in a video server, for example. By using unique identities for the sources, the grain store can provide grains independent of form and sequence such that the grain can be played back at any time in response to a media access request.

Yet further, multiple sources can be grouped to form a clip that has one or more tracks in order to offer mixed media access to video, audio and ancillary data payloads. In one aspect, each video file or clip hosted by (or otherwise received by) the grain store 110 can be in JSON (JavaScript Object Notation) format, for example. Thus, the grain store 110 can be configured to receive and/or store video clips (in JSON) that are comprises as a number of tracks that are made up of segments (e.g., contiguous frames or "grains"). These tracks or ranges in the source each can have an identity (e.g., ID of the media). The identity of essence essentially indicates its uniqueness. Moreover, the ranges of media content can include a length (e.g., 100 frames) and offset from start of the clip. The grain store manager 112 can be configured to store an ID for each range and/or each file that helps access source content. These JSON files can also be stored in a database of the grain store 110 along with criteria, including time, quality and target, as discussed below, such that the grain store manager 112 can be configured to access the content for transfer to a particular target (e.g., target site 117A and/or 117B) at a particular time and quality.

To optimally distribute the content, the grain store manager 112 is configured to receive a media access request from a client device application, which can be executing a media production workflow (e.g., a broadcast production), for example. The media access request is constructed to specify the functional requirements and timing requirements of the available media production resources for the media production workflow. Upon receiving this media access request, the grain store manager 112 can access a portion of the individual files in the grain store 110 (which can be geographically distributed) having a corresponding unique identity and descriptor and also according to the folder layout based on the timing requirements specified in the received media access request. The grain store manager 112 can then return the accessed portion of the individual files to the client device application to satisfy the media production workflow. In another exemplary aspect, the grain store manager 112 can then return the accessed portion of the individual files to a virtual file system, for example.

FIG. 2A illustrates a block diagram of a system 200A for optimizing the distribution of available media production resources according to an exemplary embodiment. As described above and in the exemplary aspect, the media content is referred to as "essence", which denotes media that can be consumed by a user (e.g., a video clip, an audio clip, and/or ancillary data such as captions). It should be appreciated that FIG. 2A can be considered a more detailed embodiment of the system 100 generally shown in FIG. 1 and described above.

As shown in FIG. 2A, the media distribution system 200A generally includes broadcast production facility 101, remote camera 102, remote distribution node 127, processing node 128, and remote production facility 151. In an exemplary aspect, media distribution system 200A can be considered a media network for real-time production and broadcasting of video and audio content.

According to an exemplary aspect, the remote production facility 151 can be implemented on one or more client devices and can be configured to create and/or execute a media production workflow. An example of a system and method for providing a system for orchestrating a media content production is disclosed in U.S. patent application Ser. No. 17/324,001, filed May 18, 2021, the entire content of which are hereby incorporated by reference. In the exemplary embodiment, the remote production facility 151 can be configured to exchange transmissions with the broadcast production facility 101. For example, the remote production facility 151 can be configured to generate and/or execute a video production workflow and request media content from broadcast production facility 101, and, more particularly, grain store 110 as will be discussed in detail below. In general, aspects of implementing the remote production facility 151 may include a live production setup on location at a sports or entertainment venue, where multiple remote cameras 102 and audio recorders may feed through controllers at the remote production facility 151 and feed to broadcast production facility 101 for media content distribution and/or broadcasting across the network.

As further shown, the media distribution system 200A can include a communication network, such as the Internet 103, and/or hardware conducive to internet protocol (IP). That is, the media distribution system can be comprised of a network of network servers and network devices configured to transmit and receive video and audio signals of various formats. For example, in an exemplary aspect, broadcast production facility 101 may receive video and audio signals (e.g., media essence) of various formats. It should be appreciated that broadcast production facility 101 is not limited to IP.

According to the exemplary aspect, broadcast production facility 101 may include one or more production switchers 108, the grain store 110, grain store manager 112 (i.e., a media distribution controller), codec 113 and transceiver 114. Broadcast production facility 101 may be a production setup for a broadcast entity and may include one or more distribution nodes 127 (e.g., electronic devices) that are configured to distribute media content to one or more distribution nodes (e.g., remote media devices), such as receivers 117A and 117B, which can be content consuming devices, for example. It should be appreciated that while only two receivers 117A and 117B are shown, the network can include a number of content consuming devices configured to receive and consume (e.g., playout) the media content. Moreover, receivers 117A and 117B can correspond to target sites 117A and 117B as shown in FIG. 1 and described above.

According to the exemplary embodiment, production switcher 108 can be a distribution node for the broadcast facility 101 and may receive media content from one or more content providers 102, for example, and distribute the media content to distribution node 127 for live broadcast content to one or more receives 117A and 117B. In this aspect, the broadcast facility 101 can include grain store 110 and grain store manager 112. However, it should be appreciated that in an alternative aspect, either of grain store 110 and grain store manager 112 can be implemented as separate components apart from and independent of broadcast facility 101 as would be appreciated to one skilled in the art.

FIG. 2B illustrates a block diagram of a system 200B for optimizing the distribution of available media production resources according to another exemplary embodiment. System 200B includes essentially the same components as described above with respect to FIG. 2A and system 200A, except that the grain store is shown in a distributed infrastructure. That is, the grain store can be comprised of a plurality of sub-components (shown as grain stores 110A, 110B and 110C) that are geographically distributed (e.g., globally) from one another. Thus, the grain stores 110A, 110B and 110C can be distributed as physical hardware (e.g., cache memory) across the network and/or distributed as separate memory storage components in the cloud.

According to the exemplary aspect of both FIGS. 2A and 2B, the downstream node(s) (e.g., remote broadcast production facility 151) can be configured to generate a request for the media content by specifying the parameters for receiving the requested media content. For example, the media delivery request (also referred to as a media access request) can include parameters relating to quality (e.g., video resolution), cost and/or delivery time for the specific media essence required for the particular workflow. In turn, the grain store manager 112 can be configured to analyze the media content request and access the requested content from the one or more grain stores using the folder layout discussed in detail below. For example, in one aspect, the media delivery request contains the identity of the essence the client requires, i.e., the grain store manager 112 can infer what media is being requested. However, the form of the media to return and the location of the grain store to use to retrieve the media will be determined by dynamically balancing the client's request for a resolution and the urgency that the client has indicated. If media is urgent, then quality can be lowered in the choice of form, such that less resources are consumed by the reply. On the other hand if high quality is requested, with no urgency, then the highest quality grain for this essence range can be returned, irrespective of the resource cost (e.g., bandwidth requirements) that this might entail.

Moreover, the grain store manager 112 can in turn be configured to control distribution of the content to the requesting device(s), as long as the requested media content satisfies the media request parameters. In an exemplary aspect, if the request specifies that the content is delivered in 24 hours, the controller can be configured to transmit a higher resolution of the media content that would take longer for total transmission. In contrast, if the media content must be delivered in one half hour, the grain store manager 112 can be configured to transmit the media content at a lower resolution. Thus, the grain store manager 112 can be configured to dynamically determine the quality (e.g., resolution and format of the delivered content) based on the requested delivery time.

In a refinement of the exemplary aspect, the grain store manager 112 can be configured to send the accessed media content to codec 113 for encoding in the video signals at a particular compression format for the transmission to satisfy the media request parameters. In general, codec 113 is configured to perform encoding of video and audio data into data packets for transmission over IP in the media distribution network. In some examples, codec 113 may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

Yet further, transceiver 114 can further be configured to process the media content signals encoded by codec 113 and transmit the encoded media streams to the requesting node (e.g., remote broadcast production facility 151, distribution node 127 or even receiver 117A or 117B) over the Internet 103. In one aspect, the transceiver 114 can include (or be coupled to) one or more servers configured to transmit the information to the requesting node as would ab appreciated to one skilled in the art. Moreover, in this network, distribution node 127 can further be configured to distribute the media content throughout the distribution network to one or more processing node(s) 128. In addition, remote distribution node 127 may feed remote processing node(s) 128 via a direct link 142, or via internet 103 connection. Examples of remote distribution node(s) 127 and processing node(s) 128 may include remote production switches similar to production switch 108 or remote signal processors similar to signal processor 111. It is also noted that while the exemplary aspect describes the transceiver as transmitting the requested grains to the requesting node/device, the grain stores (e.g., grain stores 210A-210B) can separately be configure to transmit the requested grains to the requesting nodes.

According to an exemplary aspect of FIGS. 2A and 2B, content provider 102 can be an IP device, configured for the A/V feed to the broadcast production facility 101 to use IP over an Ethernet connection 140. In an exemplary aspect, content provider 102 can be configured for an A/V feed across links 141 and 138 via the internet 103. Moreover, it should be appreciated that while the exemplary aspect uses content provider 102 as a remote production camera (which may be located at a live event, for example), a similar configuration can be used for a remote video server, for example, that is communicatively coupled to the grain store 110 and provided to transmit the content through the media distribution network using the exemplary techniques described above. In general, content provider 102 as shown in FIGS. 2A and 2B can correspond to one or more of content providers 102A-102C as shown in FIG. 1 and described above.

Figure 3:
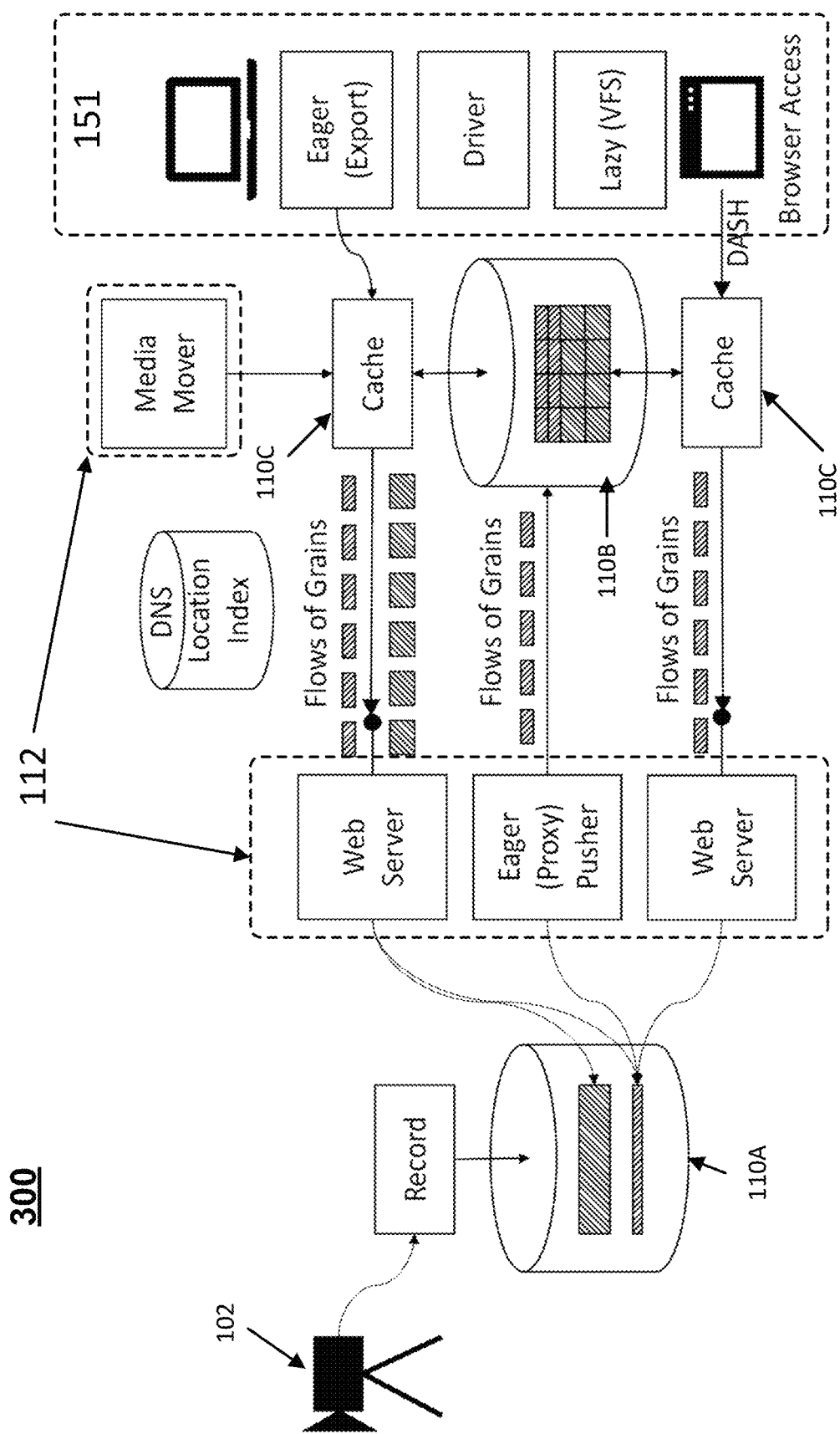
FIG. 3 illustrates a block diagram of a system for optimizing the distribution of available media production resources according to an exemplary embodiment.

FIG. 3 illustrates a block diagram of a system 300 for optimizing the distribution of available media production resources according to an exemplary embodiment. In general, system 300 illustrates an implementation (or a subsection thereof) of either of systems 200A and/or 200B as described above and includes the same components as described below.

In particular, the system media distribution 300 generally includes content provider 102, which can correspond to one or more of content providers 102A, 102B and 102C, and is shown as a media production camera in the exemplary embodiment. Moreover, upon recording live content (i.e., a plurality media essence or grains), the content provider 102 is configured to provide the essence to grain store 110A. In the exemplary system 300, the grain store is shown as a plurality of distributed components, i.e., grain stores 110A, 110B and 110C, which can comprise a distributed system of cache for storing the respective grains of the media essence. As noted above, the grain store is generally configured as a distributed storage system for storing the plurality of grains for subsequent access.

As described above, the grain store manager 112 is generally configured to store each of the received essence grains upon receipt into individual files according to a folder layout. The files are stored in the distributed grain stores 110A-110C. The folder layer (i.e., the grain store registry) is constructed to enable access of the requested grains in response to a media access request. In the exemplary aspect of FIG. 3, the grain store manger 112 can be implemented as one or more web servers or similar computing devices that are configured to process the media access requests from client devices, such as broadcast production facility 151. In a refinement of the exemplary aspect, the grain store manager 112 can include a "media mover" for moving content to a target system, such as the system and method for moving media content over a network, as described in U.S. patent application Ser. No. 17/457,343, filed Dec. 2, 2021, the entire contents of which are hereby incorporated by reference.

In general, the grain store manager 112 is configured to store one or more grains into respective files that are then stored in the grain store 110. Moreover, the grain store manager is configured to dynamically name each of the individual files upon receipt of the respective grains, such that the folder layout (i.e., the registry) forms a natural index that maps bytes of the essence grains to a numerical index (e.g., a plurality of time values or a monotonically increasing number count) of the essence grains, respectively.

Figure 4:
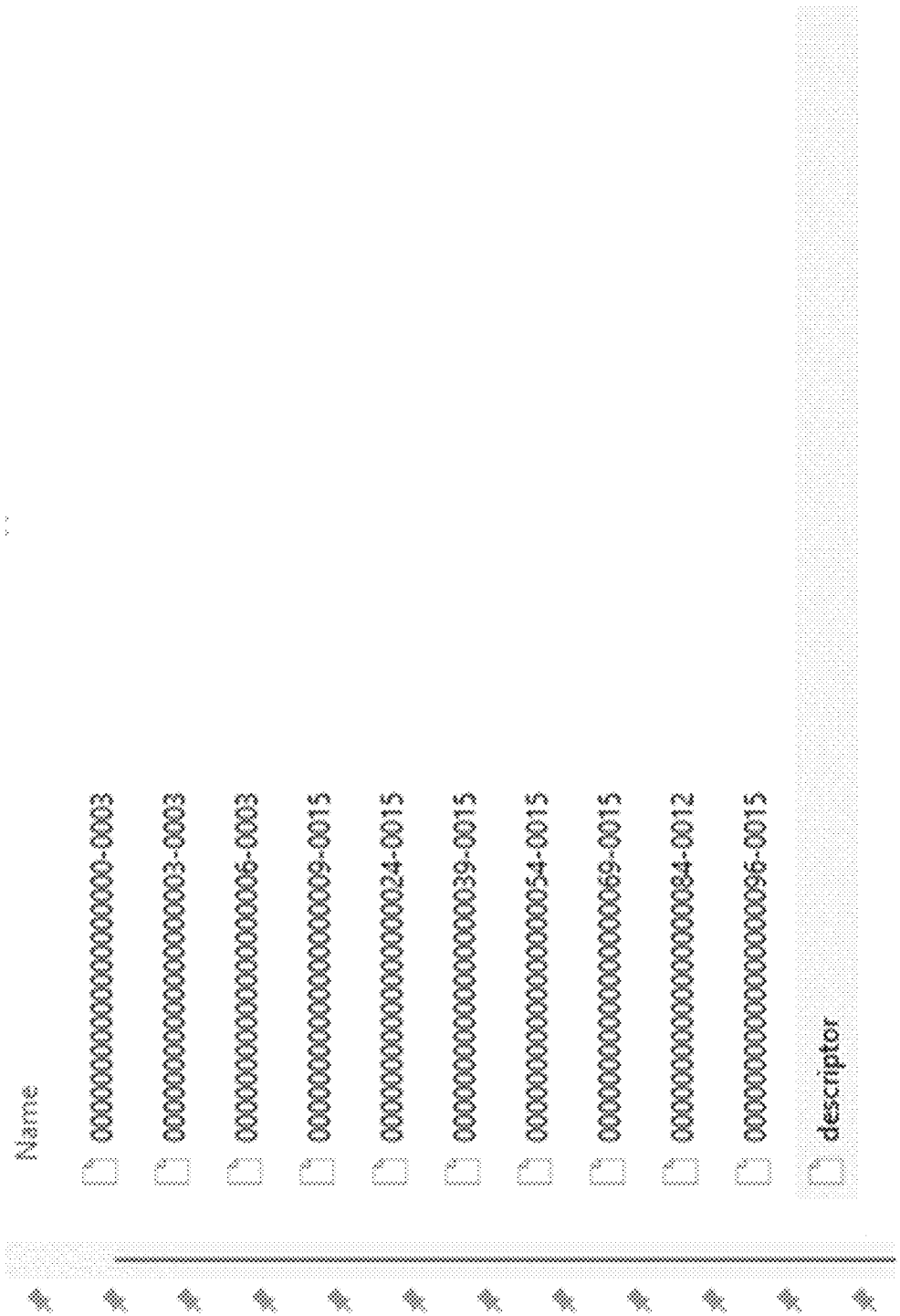
FIG. 4 illustrates a folder layout for optimizing the distribution of available media production resources according to an exemplary embodiment.

FIG. 4 illustrates a folder layout, i.e., a registry, according to an exemplary aspect. Thus, according to the exemplary aspect, the addresses of the files themselves can be virtually reallocated with the grain store(s) and the addresses can be sequentially monitored through the concept of the folder layout with the natural index for the grains. FIG. 4 illustrates a simple disk layout for an exemplary grain store, in which each of the first three files have three grains (i.e., "0003") and are named "0000 . . . 0000", "0000 . . . 0003" and "0000 . . . 0006". In this example, the names of the individual files continue in a sequential order and are named according to the number of essence grains in each file. Accordingly, it should be appreciated that in the exemplary aspect, the name of the individual files and the folder layout are independent of a file stream definition and a file storage type of the received media files.

Moreover, the grain store manager 112 is configured to generate a descriptor for each flow of files in the folder layout that identifies a format of the respective flow, where each flow includes a plurality of essence grains that have the same format. Yet further, the grain store manager 112 generates a unique identity for a plurality of sources in the grain store 110 that each include a group of flows offering the same essence at different formats.

In operation, grains can be received from the various content providers 102 out of order (e.g., if they are being transferred from another source). Advantageously, the grain store manager 112 can cache the essence grains according to the folder layout to facilitate optimal distribution of the essence upon received a media access request. The grain stores also scale very well with many distributed locations geographically apart from each other, making so this cache semantic can be shared by multiple playout or render devices (e.g., client devices for subsequent media production workflows). Yet further, the grains can be stored in the grain stores 110A-110C upon receipt rather than waiting for the entire media content to render into a monolithic file as is required for conventional systems. Likewise, portions of the media content (e.g., ranges) can each be stored in separate files that are distributed in separate locations of the grain stores 110A-110C, rather than storing the entire monolithic file in a single location.

Moreover, in an exemplary aspect, the grain stores 110A-110C can be configured to control the lifetime of their contents using a number of algorithms. For example, a simple approach is deleting the "Least Recently Used" when a threshold is crossed, for example, if the particular grain has not been accessed by a set amount of time (e.g., 1 month) the particular grain store can delete that grain. In other instances, some grains may be required even if they are old, so they can be locked by creating a file with an in-out range filename in a locks folder according to the folder layout managed by grain store manager 112. More particularly, an administrator can assign only a range of media essence of an entire media file for being locked and thus only that range will be kept and available to manage memory consumption. A simple extension to this lock mechanism enables Tank Track (loop) recordings, for example.

In general, grain stores 110A-110C can be stored on local disks or they may be stored on disks with shared concurrent access, such as network-attached storage platform, like Isilon NAS storage. In either case, the distributed architecture configures the grain store manager 112 to enable multiple processes that can write to and read from the grain store 110A-110C concurrently. A powerful property of this folder structure is that many processes can safely share access to these files, with only folder structure as their communication method.

The grain store manager 112 is configured to dynamically respond to media access requests. Referring back to FIG. 3, the broadcast production facility 151 can be an example of a client device the can execute a media production workflow. In operation, the broadcast production facility 151 may require a portion of media essence to execute the workflow. Thus, the broadcast production facility 151 can be configured to generate a media access request that specifies functional requirements and timing requirements of the available media production resources for the media production workflow. In particular, the media access request can define the range of content, a required quality of the content, and the time needed to receive the requested content, for example. This request can be transmitted to the grain store manager 112 and grain store 110, which can be processed and in turn returned to the client device.

In one aspect, a virtual file system (VFS) can be built on top of the grain stores 110 to receive the media access request and coordinate with the grain store manager 112 to process the media access request. That is, the VFS can be listed in the workflow as an available system of assets for the media production. In this aspect, the VFS can be configured to pass the media access request to the grain store manager 112 that dynamically accesses a portion of the plurality of essence grains in the individual files distributed through the grains stores 110A-110C. The grain store manager 112 can be configured to receive the media access requests directly from the client device (e.g., broadcast production facility 151) and/or from the VFS coupled to the broadcast production facility 151.

In either case and to process the request, the grain store manager 112 can be configured to identify the unique identity of the respective groups of flows in the grain stores and also the descriptor for the respective format of the flow that satisfies the functional requirements (e.g., the format set forth in the media access request). Next, the grain store manager 112 is further configured to access the portion of the individual files in the grain stores 110A-110C having the identified unique identity and descriptor and according to the folder layout based on the timing requirements specified in the received media access request. Finally, the grain store manager 112 (e.g., as a web server) is configured to return the accessed portion of the individual files to the virtual file system to be provided to the client device application (e.g., broadcast production facility 151) to satisfy the media production workflow.

Advantageously, by traversing the folder layout to identify only the required grains, the grain store manager 112 is configured to transfer only the frames needed for playout (i.e., as part of the media production workflow) while utilizing the entire internet connection to any grain store on the public internet that stores the required grain. In one implementation, a replay operator (e.g., operating broadcast production facility 151) can select and in/out and loads into the record train, the grains would be sent to the playout server of their choice automatically. As a result, the grain transfer would finish before the operator has made their final reel since the grain manager is only selecting the desired content using the folder layout. As such, any playout server can play a recipe for the workflow that can be created just in time, while the grains had time to make it.

Moreover, the distributed nature of the grain store 110A-110C enables client device to access the media locally or even in dispersed locations which allows for instant distribution. Since the VFS is talking to multiple grain stores around the world, a third-party system could access an MXF file like it was local even though some elements are caching in the background.

Figure 5:
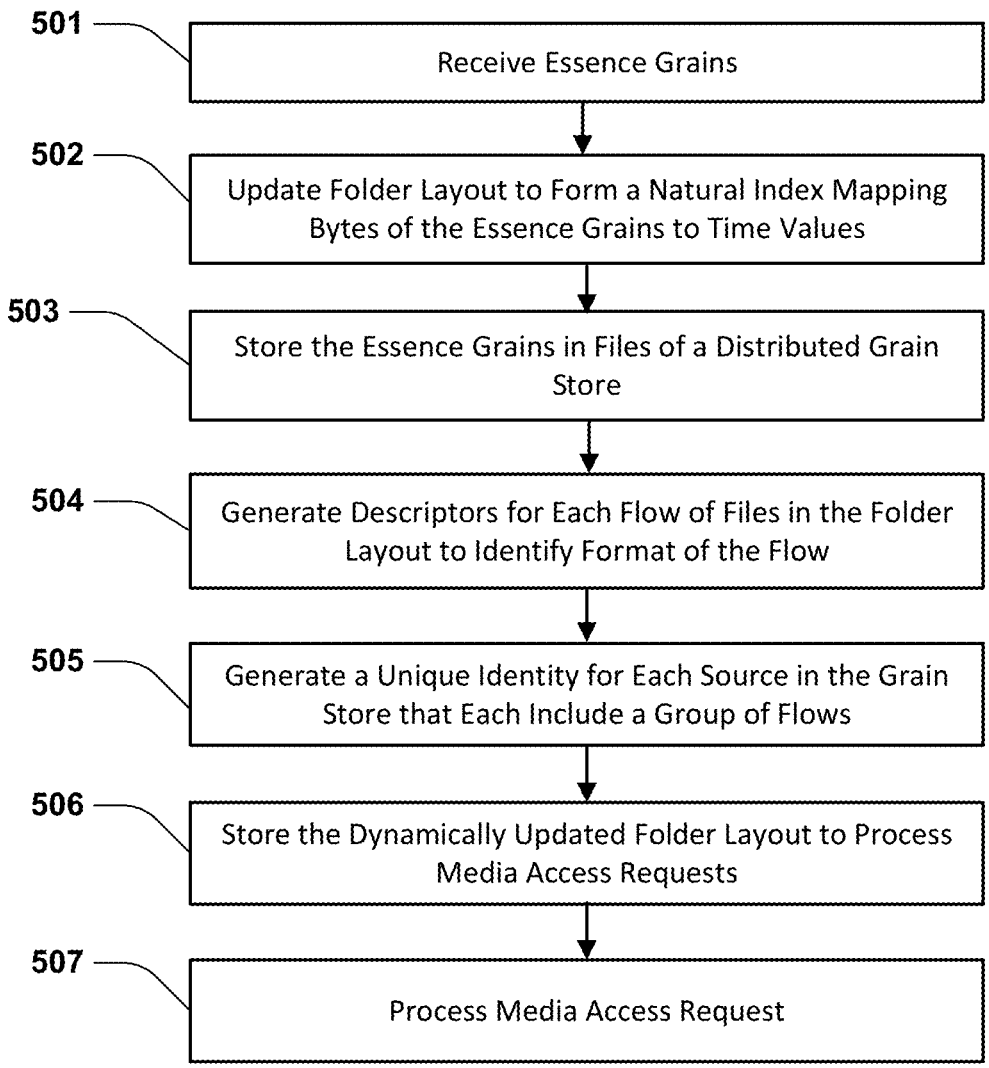
FIG. 5 illustrates a flowchart for a method for optimizing the distribution of available media production resources according to an exemplary embodiment.

FIG. 5 illustrates a flowchart for a method for optimizing the distribution of available media production resources according to an exemplary embodiment. In an exemplary aspect, it is noted that the method 500 can be performed using one or more of the components described above with respect to FIGS. 1-3, and in particular, grain store 110 and grain store manager 112.

As shown, media essence (e.g., video or audio content) is received at Step 501, which can be received from a content provider such as a media production camera or video server, for example. Moreover, the grains of the media essence can be received as they are generated, rather than waiting for the entire monolithic file to be generated. At Step 502, the folder layout configured for the grain store (e.g., distributed grain stores 110A-110C) is generated and dynamically updated as the grains are received to from a natural index that maps the bytes of the grains of the media essence to corresponding time values. In an exemplary aspect, the time values can be generate as a monotonic increasing count, for example.

At Step 503, the essence grains are stored as files in the distributed grain store infrastructure. That is, one or more grains are stored in each file and, in turn, each file can be stored in the respective grain stores 110A-110C. According to an exemplary aspect, predetermined or dynamic policies can determine the grain location for each grain placement choice. For example, one policy could be to distribute grains in a round robin manner in the respective grain stores 110A-110C, and thus increase the available bandwidth in the system by aggregating the storage systems resources. In another aspect, the policy can be set to keep multiple copies of each grain, increasing the resilience and availability of the set of grain stores in case any one instance should go off line. The other effect of writing multiple copies to geographically remote grain stores is to exploit locality when clients request grain, as a local grain store can return grains with lower latency to a client than a grain store in a different continent. These different policies can be set by a system administrator according to an exemplary aspect.

In one aspect, each flow contains a range, which is a contiguous group of one or more grains of the media essence. Moreover, a descriptor is assigned at Step 504 for each flow of files in the folder layout. The descriptors can be used to access the requested media content from the media access request when the grain store manager traverses the folder layout. At Step 505, the grain store manager 112 generates a unique identity for each source in the grain store 110, that each includes a group of flows. The dynamically updated folder layout can be stored in memory of the data store manager 112 and also distributed to multiple web servers (e.g., additional grain store managers that are located remotely from one another) that can concurrently process media access requests from different client devices. Finally, at Step 507, these web servers are configured to process media access requests by traversing the folder layout describing the distributed media content in the grain stores 110A-110C using the methods described above.

Figure 6:
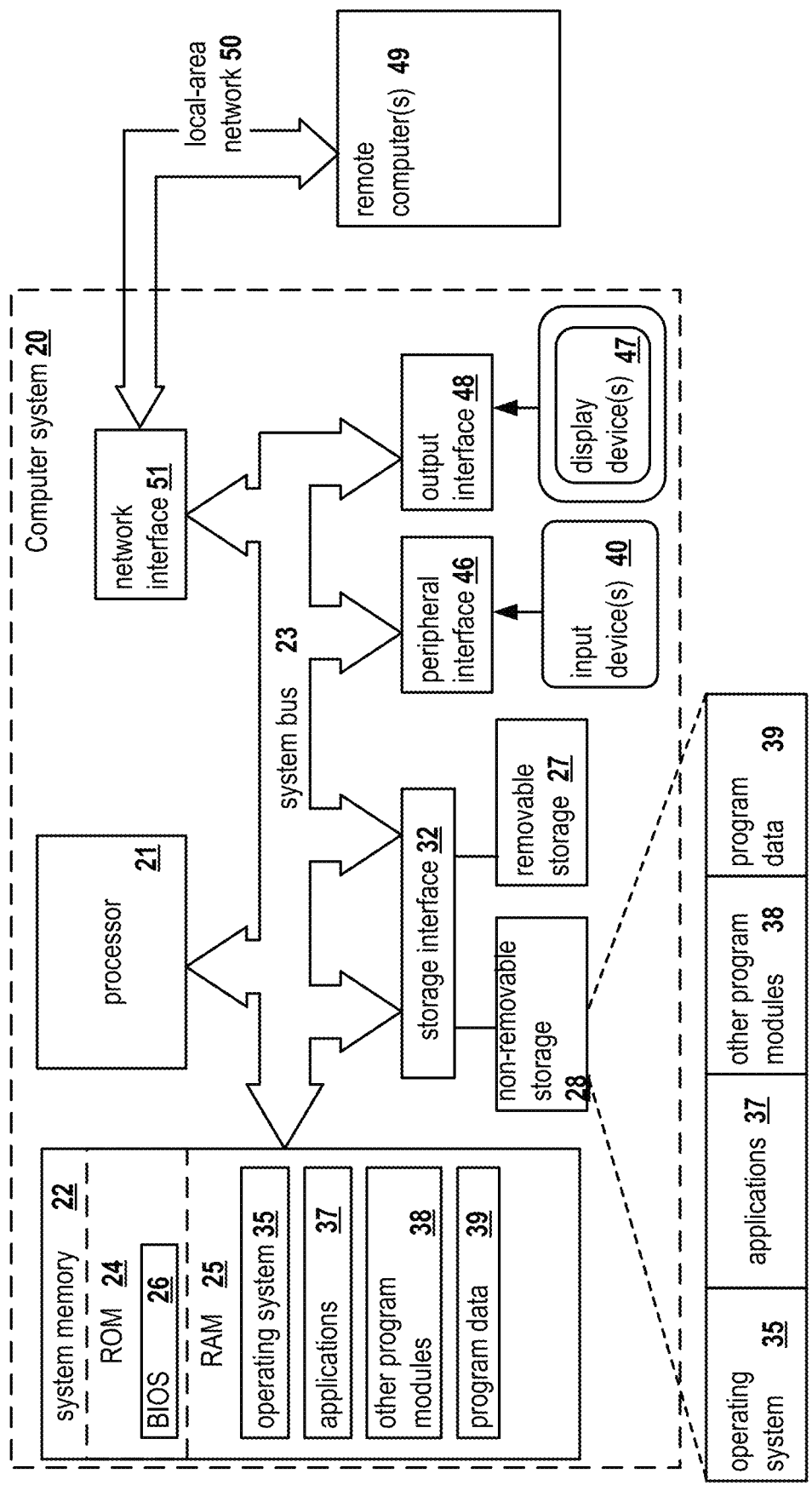
FIG. 6 is a block diagram illustrating a computer system on which aspects of systems and methods for optimizing the distribution of available media production resources according to an exemplary embodiment.

FIG. 6 is a block diagram illustrating a computer system on which aspects of systems and methods for optimizing the distribution of available media production resources according to an exemplary embodiment. It should be noted that the computer system 20 can correspond to any computing system configured to execute the grain store manager 112 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to grain stores 110A-110C (e.g., cache for the essence grains).

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote client devices as described above with respect to FIG. 1 or, in the alternative, to one or more of grain stores 110A-110C (e.g., cache for the essence grains), for example.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 1, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for optimizing the distribution of media production resources, the system comprising:
a receiver configured to receive a plurality of essence grains of at least one media file;
a grain store comprising a persistent file system configured to store each of the received plurality of essence grains upon receipt into individual files according to a folder layout;
a grain store manager configured to:
dynamically name the individual files upon receipt of the plurality of essence grains, such that the folder layout forms a natural index mapping bytes of the essence grains to a numerical index of the essence grains, respectively,
generate a descriptor for each of a plurality of flows of files in the folder layout to identify a format of each respective flow, with each of the plurality of flows including a plurality of essence grains being the same format,
generate a unique identity for a plurality of sources in the grain store that each include a group of flows offering the same essence at different formats, and
receive a media access request from a client device application based on a media production workflow that specifies functional requirements and timing requirements of the available media production resources for the media production workflow,
wherein the grain store manager is further configured to dynamically access a portion of the plurality of essence grains in the individual files by:
identifying the unique identity of the respective group of flows and the descriptor for the respective format of the flow in the group that satisfies the functional requirements,
accessing a portion of the individual files having the identified unique identity and descriptor and according to the folder layout based on the timing requirements specified in the received media access request, and
returning the accessed portion of the individual files to the client device application to satisfy the media production workflow,
wherein the name of the individual files and the folder layout are independent of a file stream definition and a file storage type of the received at least one media file, and
wherein the essence grains each comprise at least one of video frames, groups of pictures of video, audio samples and ancillary data of media content.

2. The system according to claim 1, further comprising a virtual file system (VFS) built on top of the grain stores and configured to receive the media access request from the client device and coordinate with the grain store manager to process the media access request and deliver the accessed portion of the individual files to the client device.

3. The system according to claim 1, wherein the grain store manager is further configured to dynamically name the individual files to configure the folder layout to provide a uniform representation of the grain store according to the numerical index of the essence grains, respectively.

4. The system according to claim 1, wherein the grain store manager is further configured to form the group of flows offering the same essence at different formats that include a plurality of resolution qualities of the same essence.

5. The system according to claim 4, wherein the grain store manager is further configured to return the accessed portion of the individual files to the client device application by balancing a requested resolution quality and a time urgency to satisfy the media production workflow.

6. The system according to claim 1, wherein the grain store is geographically distributed across a plurality of separate grain store locations.

7. A system for optimizing the distribution of media production resources, the system comprising:
a grain store comprising a persistent file system that is geographically distributed across a plurality of physical locations and that is configured to store each of a plurality of essence grains upon receipt by the grain store into a plurality of individual files according to a folder layout; and
a grain store manager configured to:
dynamically name the individual files upon receipt of the plurality of essence grains, such that the folder layout forms a natural index mapping bytes of the essence grains to a numerical index of the essence grains, respectively,
generate a descriptor for each of a plurality of flows of files in the folder layout to identify a format of each respective flow, with each of the plurality of flows including a plurality of essence grains being the same format,
generate a unique identity for a plurality of sources in the grain store that each include a group of flows offering the same essence at different formats,
receive a media access request from a client device application based on a media production workflow that specifies functional requirements and timing requirements of the available media production resources for the media production workflow, and
dynamically access a portion of the plurality of essence grains in the individual files by:
identifying the unique identity of the respective group of flows and the descriptor for the respective format of the flow in the group that satisfies the functional requirements,
accessing a portion of the individual files having the identified unique identity and descriptor and according to the folder layout based on the timing requirements specified in the received media access request, and
returning the accessed portion of the individual files to the client device application to satisfy the media production workflow.

8. The system according to claim 7, wherein the name of the individual files and the folder layout are independent of a file stream definition and a file storage type of the received at least one media file.

9. The system according to claim 7, wherein the essence grains each comprise at least one of video frames, groups of pictures of video, audio samples and ancillary data of media content.

10. The system according to claim 7, further comprising a virtual file system (VFS) built on top of the grain stores and configured to receive the media access request from the client device and coordinate with the grain store manager to process the media access request and deliver the accessed portion of the individual files to the client device.

11. The system according to claim 7, wherein the grain store manager is further configured to dynamically name the individual files to configure the folder layout to provide a uniform representation of the grain store according to the numerical index of the essence grains, respectively.

12. The system according to claim 7, wherein the grain store manager is further configured to form the group of flows offering the same essence at different formats that include a plurality of resolution qualities of the same essence.

13. The system according to claim 12, wherein the grain store manager is further configured to return the accessed portion of the individual files to the client device application by balancing a requested resolution quality and a time urgency to satisfy the media production workflow.

14. A system for optimizing the distribution of media production resources, the system comprising:
   a grain store comprising a persistent file system configured to store each of a plurality of essence grains upon receipt into a plurality of individual files according to a folder layout; and
   a grain store manager configured to:
      dynamically name the individual files upon receipt of the plurality of essence grains to configure the folder layout to form a natural index that maps bytes of the essence grains to a numerical index of the essence grains, respectively,
      generate a descriptor for each of a plurality of flows of files in the folder layout to identify a format of each respective flow,
      generate a unique identity for a plurality of sources in the grain store that each include a group of flows offering the same essence at different formats,
      receive a media access request from a client device application based on a media production workflow that specifies requirements of the available media production resources for the media production workflow,
      dynamically access a portion of the plurality of essence grains in the individual files by identifying the unique identity of the respective group of flows and the descriptor for the respective format of the flow in the group that satisfies the requirements, and
      return the accessed portion of the individual files to the client device application to satisfy the media production workflow.

15. The system according to claim 14, wherein each of the plurality of flows including a plurality of essence grains being the same format.

16. The system according to claim 14, wherein the name of the individual files and the folder layout are independent of a file stream definition and a file storage type of the received at least one media file.

17. The system according to claim 14, wherein the essence grains each comprise at least one of video frames, groups of pictures of video, audio samples and ancillary data of media content.

18. The system according to claim 14, further comprising a virtual file system (VFS) built on top of the grain stores and configured to receive the media access request from the client device and coordinate with the grain store manager to process the media access request and deliver the accessed portion of the individual files to the client device.

19. The system according to claim 14, wherein the grain store manager is further configured to dynamically name the individual files to configure the folder layout to provide a uniform representation of the grain store according to the numerical index of the essence grains, respectively.

20. The system according to claim 14, wherein the grain store manager is further configured to form the group of flows offering the same essence at different formats that include a plurality of resolution qualities of the same essence.

21. The system according to claim 20, wherein the grain store manager is further configured to return the accessed portion of the individual files to the client device application by balancing a requested resolution quality and a time urgency to satisfy the media production workflow.

22. The system according to claim 14, wherein the grain store is geographically distributed across a plurality of separate grain store locations.

* * * * *